United States Patent
Kim

(10) Patent No.: US 6,871,857 B2
(45) Date of Patent: Mar. 29, 2005

(54) MECHANICAL SEALING APPARATUS

(76) Inventor: Jong Won Kim, 255-3 Hagunri, Yangchonmyeon, Gimposi, Gyeonggido (KR)

( * ) Notice: Subject to any disclaimer, the term of this patent is extended or adjusted under 35 U.S.C. 154(b) by 34 days.

(21) Appl. No.: 10/156,010

(22) Filed: May 29, 2002

(65) Prior Publication Data

US 2003/0085526 A1 May 8, 2003

(30) Foreign Application Priority Data

Nov. 7, 2001 (KR) .......................................... 2001-69262

(51) Int. Cl.⁷ ................................................. F16J 15/38
(52) U.S. Cl. ......................... 277/390; 277/518; 277/520
(58) Field of Search ................................ 277/390, 348, 277/396, 352, 358, 518, 520, 408, 364

(56) References Cited

U.S. PATENT DOCUMENTS

| | | | | |
|---|---|---|---|---|
| 3,582,089 A | * | 6/1971 | Amorese | 277/364 |
| 3,591,188 A | * | 7/1971 | Eisner | 277/366 |
| 3,877,706 A | * | 4/1975 | Haas et al. | 277/366 |
| 6,325,378 B1 | * | 12/2001 | Okumachi et al. | 277/348 |
| 2001/0052673 A1 | * | 12/2001 | Okumachi et al. | 277/348 |

* cited by examiner

*Primary Examiner*—William L. Miller
(74) *Attorney, Agent, or Firm*—Birch, Stewart, Kolasch & Birch, LLP

(57) ABSTRACT

Disclosed herein is a mechanical sealing device for preventing fluid leakage. The sealing device has a sealing chamber formed by a flange, a seal casing and a seal cover at a position outside a gland ring. This gland ring is used for holding the gland packings installed in a stuffing box of each of rotary and stationary sealing rings. The rotary and stationary sealing rings are provided in the sealing chamber. In this case, the rotary sealing ring is fixed to a sleeve. The stationary sealing ring comes into contact with both the sleeve and the rotary sealing ring, and is held by a slip ring biased by a spring. The spring is provided between the stationary sealing ring and the flange. Further, the sealing device has an additional sealing ring, which is provided on the inner surface of each of the gland ring and the seal cover, and comes into contact with the sleeve.

4 Claims, 4 Drawing Sheets

MECHANICAL SEALING APPARATUS

BACKGROUND OF THE INVENION

1. Field of the Invention

The present invention relates generally to a mechanical sealing device for preventing fluid leakage, which is additionally installed at a position around each of interior and exterior sealing units which are mounted at both sides of a power drive unit so as to prevent fluid from leaking out of a shaft rotatably installed on the sidewall of a fluid tank containing fluid, such as gas or liquid, thus accomplishing a double-sealing effect. More particularly, this invention relates to a mechanical sealing device for preventing fluid leakage, which forms a sealing chamber by means of a flange, a seal casing and a seal cover at a position outside a gland ring used for holding the gland packings installed in a stuffing box, and which is provided in the sealing chamber with both a rotary sealing ring fixed to a sleeve and a stationary sealing ring positioned to come into contact with both the sleeve and the rotary sealing ring, and in which the stationary sealing ring is held by a spring-biased slip ring, and which also has additional sealing rings brought into contact with the sleeve at the inner surfaces of the gland ring and the seal cover.

2. Description of the Prior Art

Recently, as the natural environment is excessively contaminated, environmental pollution, including air pollution, is considered as an important social problem. Above all, gas produced from nitric-acid slurry is worse than other contaminants, due to its offensive odor.

Thus, in order to prevent environmental pollution caused by fluid leakage, there has been proposed a mechanical sealing device, which serves to prevent fluid from leaking out of a shaft that is rotatably installed to a fluid tank containing fluid, such as gas or liquid, and is rotated by a power drive unit. The conventional sealing device will be described with reference to FIGS. 1 to 3.

A hole 1-1 is formed through the sidewall of a fluid tank 1 such that a first shaft 2 is inserted into the hole 1-1. A support plate 1-2 is mounted to the sidewall of the tank 1 at a position around the hole 1-1. A plurality of bolt rods 1-3 are set in the support plate 1-2 at regular intervals. The first shaft 2 to which a power drive unit 30 is mounted is inserted into the hole 1-1. A second shaft 2-1 of a pipe shape is coupled to an end of the first shaft 2 exposed to the outside of the power drive unit 30.

That is, the first and second shafts 2 and 2-1 are provided at both sides of the power drive unit 30, respectively. An interior sealing unit 31 is installed on the first shaft 2, while an exterior sealing unit 32 is installed on the second shaft 2-1.

A sleeve 3 is fitted over each of the first shaft 2 of the interior sealing unit 31 and the second shaft 2-1 of the exterior sealing unit 32. Two stuffing boxes 6 are installed to the outer surfaces of the two sleeves 3 such that the first stuffing box 6 of the interior sealing unit 31 is opposite to the second stuffing box 6 of the exterior sealing unit 32. In this case, each of the two stuffing boxes 6 is provided with a plurality of gland packings 5. A flange 6-1, mounted to the stuffing box 6 of the interior sealing unit 31, is mounted to the support plate 1-2 by the bolt rods 1-3, thus being mounted to the fluid tank 1, with nuts 1-4 tightened to the bolt rods 1-3. Meanwhile, a support frame 35 is mounted to the stuffing box 6 of the exterior sealing unit 32, with a bearing 36 interposed between the frame 35 and said stuffing box 6. In the interior sealing unit 31 constructed in this way, the sleeve 3 is rotated along with the shaft 2 by power generated from the power drive unit 30, in the stop mode of the fluid tank 1, the stuffing box 6 and the gland packings 5. In the exterior sealing unit 32, the stuffing box 6 is rotated together with the gland packings 5, in the stop mode of the shaft 2-1, the shaft 2 and the sleeve 3.

However, such a conventional sealing device has a problem that fluid easily leaks out from the shaft, because the device is designed in such a way that its interior and exterior sealing units 31 and 32 perform a sealing function using only the gland packings 5, so the device cannot fulfill a complete sealing function in the case where the contact surfaces of the gland packings 5 and the sleeves 3 are worn. The conventional sealing device may thus cause air pollution, due to toxic gas produced by fluid, and spread offensive odor when there occurs fluid leakage. The toxic gas may do harm to the health of local inhabitants.

Further, when the gland packings 5 and the sleeves 3 are worn to reduce the sealing function of the sealing device, they must be replaced with new ones. But, since the gland packings 5 and the sleeves 3 are heavy, it is not easy to replace them with new ones, and besides, it takes a long time to replace them with new ones. In addition, the conventional sealing device has other problems that downtime is prolonged due to frequent replacement work, and the repair cost of the device is high.

SUMMARY OF THE INVENTION

Accordingly, the present invention has been made keeping in mind the above problems occurring in the prior art, and provides a mechanical sealing device for preventing fluid leakage, which is improved in its structure in an effort to solve the above-mentioned problems.

An object of the present invention is to provide a mechanical sealing device for preventing fluid leakage, which enhances the sealing function of existing interior and exterior sealing units provided at both sides of a power drive unit, respectively, for sealing the outer surface of a shaft rotatably installed at the sidewall of a fluid tank, and which forms a sealing chamber by means of a flange, a seal casing and a seal cover at a position outside a gland ring used for holding the gland packings installed in a stuffing box of each of the two sealing units, and which is provided in the sealing chamber with a rotary sealing ring fixed to the sleeve and a stationary sealing ring coming into contact with both the sleeve and the rotary sealing ring, and in which the stationary sealing ring is held by a spring-biased slip ring, and which also has additional sealing rings positioned to come into contact with the sleeve at the inner surfaces of the gland ring and the seal cover.

Another object of the present invention is to provide a mechanical sealing device for preventing fluid leakage, which is additionally installed at a position around the existing interior and exterior sealing units provided on both sides of a power drive unit, respectively, and which thus accomplishes a double-sealing effect, and enhances the sealing function, and which includes a plurality of O-rings and sealing rings, thus remarkably improving its sealing effect.

A further object of the present invention is to provide a mechanical sealing device for preventing fluid leakage, which reduces frictional abrasion at its contact surfaces, thus being usable for a lengthy period of time, and not requiring frequent replacement of its elements with new ones, thus reducing its maintenance and repair cost, and which has a simple construction, thus being easily produced at low cost, and which accomplishes a desired sealing effect regardless of requiring such low maintenance, repair and production costs.

Still another object of the present invention is to provide a mechanical sealing device for preventing fluid leakage, which forms a plurality of holes on the contact surface of the seal casing made of a material including carbon, graphite filled Teflon, metal, thus accomplishing a desired cooling and lubricating effect, and achieving a dry-running operation; or which forms a plurality of semicircular holes on the seal casing made of a material including carbon, graphite filled Teflon, metal, and injects nitrogen gas into the semicircular holes, thus accomplishing a desired dry-running operation; or which forms a true circular part at the intermediate portion of the seal casing made of a material including carbon, graphite filled Teflon, metal, and injects nitrogen gas, thus accomplishing a desired dry-running operation.

In order to accomplish the above object, the present invention provides a mechanical sealing device for preventing fluid leakage, comprising: a support plate mounted at a position around a hole formed through the sidewall of a fluid tank for receiving a first shaft in the hole, with a plurality of bolt rods arranged on the support plate at regular intervals; the first shaft inserted into the hole, with a power drive unit being mounted to the first shaft; a second shaft having a pipe shape and coupled to an end of the first shaft exposed to the outside of the power drive unit; an interior sealing unit installed on the first shaft and an exterior sealing unit installed on the second shaft, with two sleeves fitted over the first and second shafts provided at both sides of the power drive unit; first and second stuffing boxes mounted to the outer surfaces of the two sleeves in such a way as to be opposite to each other, with a plurality of gland packings being provided in each of the two stuffing boxes; a flange mounted to the first stuffing box of the interior sealing unit, and fitted over the bolt rods of the support plate mounted to the fluid tank, and fixed by nuts tightened to the bolt rods; and a support frame mounted to the second stuffing box of the exterior sealing unit with a bearing interposed between the frame and the second stuffing box, the sealing device further comprising: a sealing chamber formed by a flange, a seal casing and a seal cover at a position outside a gland ring used for holding the gland packings installed in the stuffing box of each of the two sealing units; rotary and stationary sealing rings provided in the sealing chamber, the rotary sealing ring fixed to the sleeve, the stationary sealing ring coming into contact with both the sleeve and the rotary sealing ring and held by a slip ring biased by a spring, with the spring provided between the stationary sealing ring and the flange; and additional sealing rings provided on the inner surfaces of the gland ring and the seal cover, and coming into contact with the sleeve.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
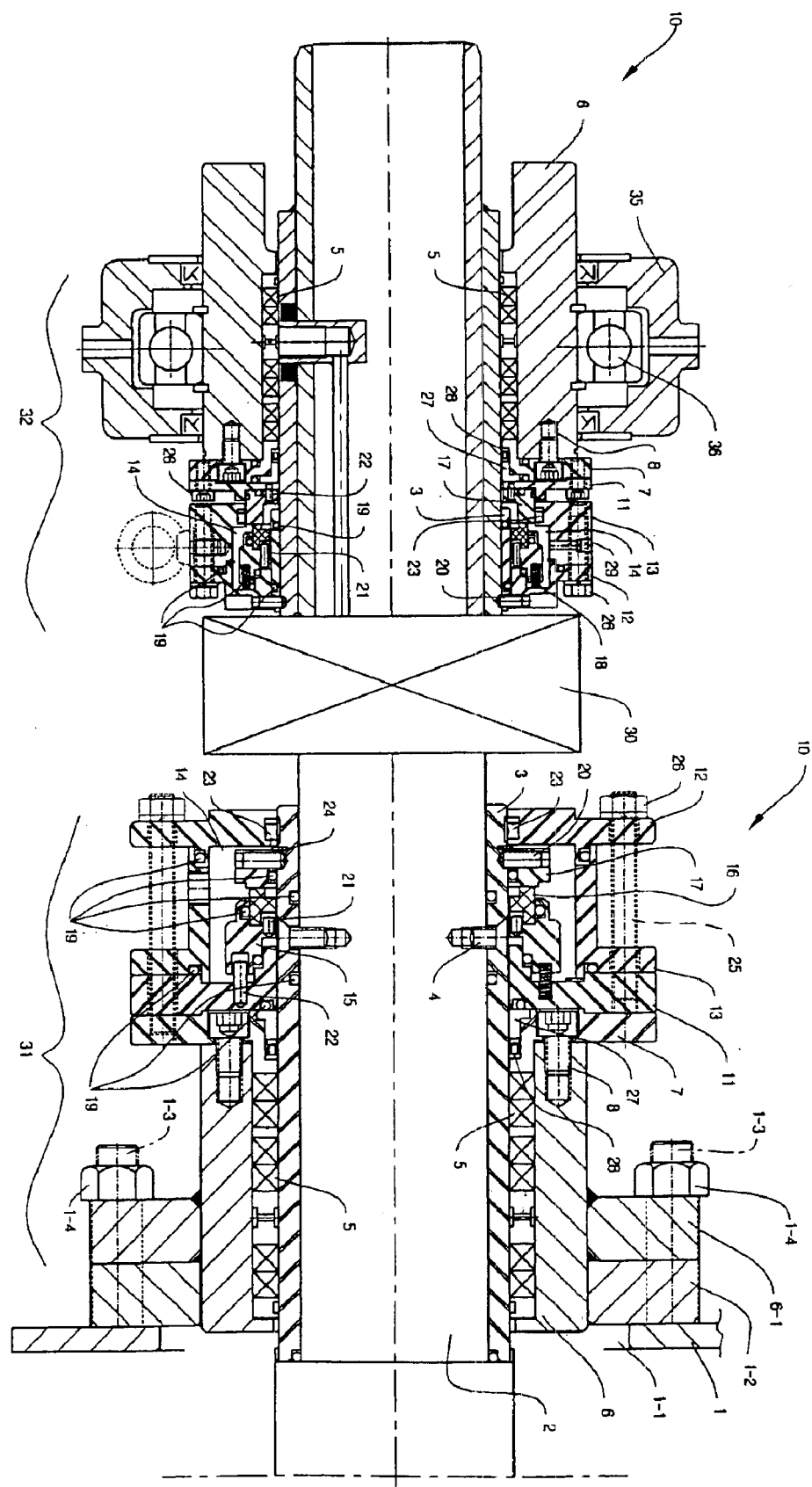
FIG. 1 is a sectional view showing a mechanical sealing device for preventing fluid leakage according to the primary embodiment of the present invention.

Reference now should be made to the drawings, in which the same reference numerals are used throughout the different drawings to designate the same or similar components.

Figure 2:
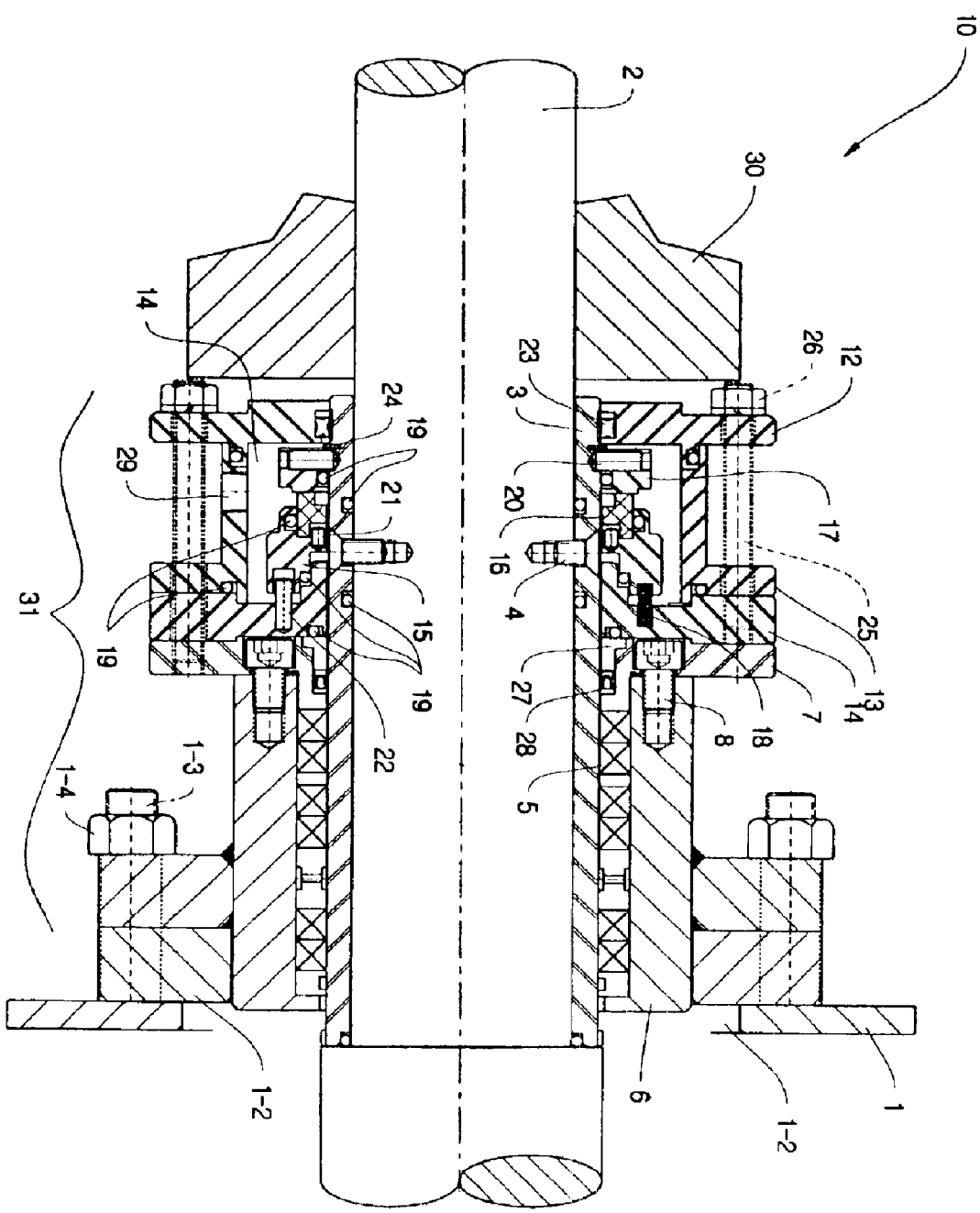
FIG. 2 is an enlarged view of an interior sealing unit included in the sealing device of this invention shown in FIG. 1.
Figure 3:
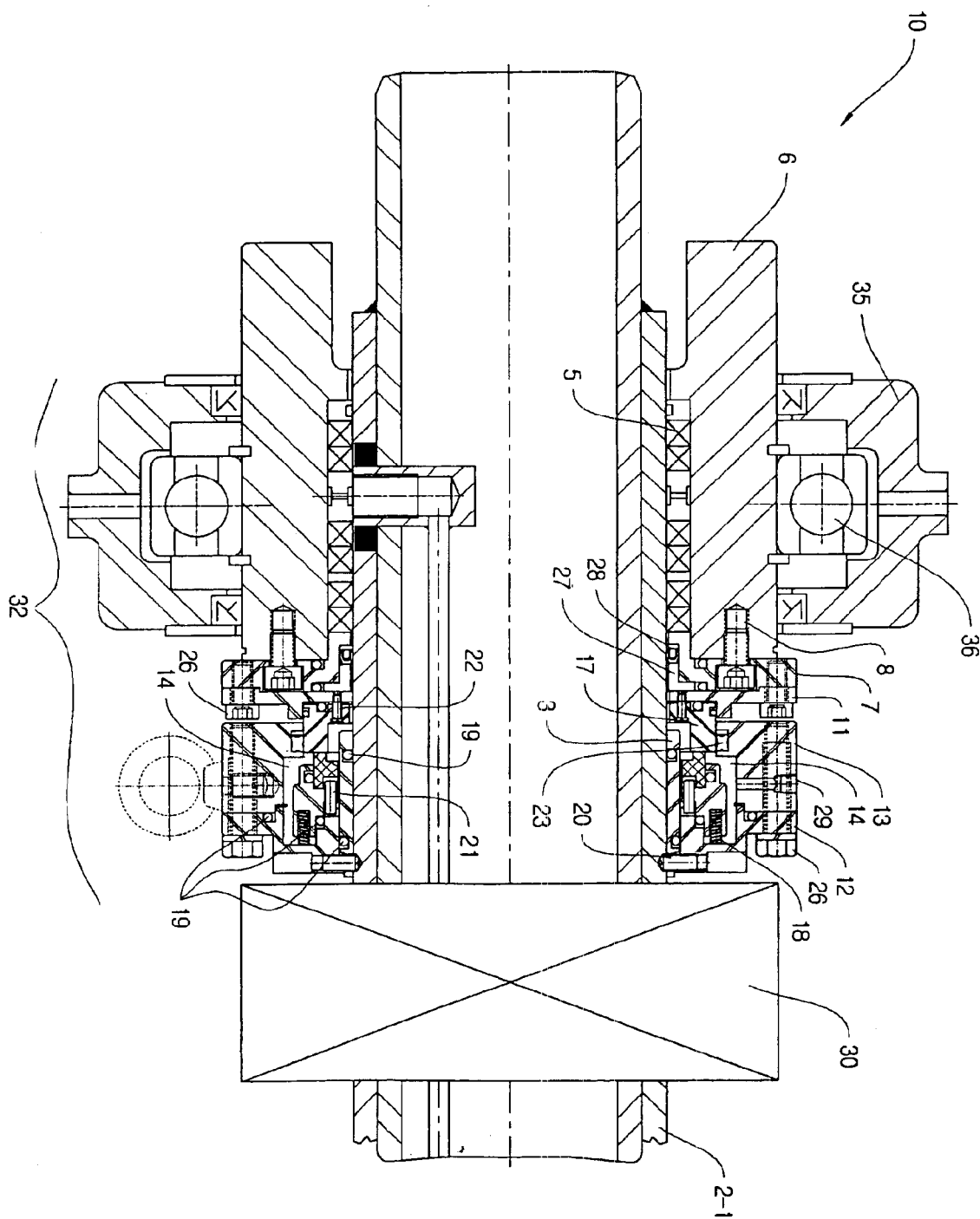
FIG. 3 is an enlarged view of an exterior sealing unit included in the sealing device of this invention shown in FIG. 1.
Figure 4:
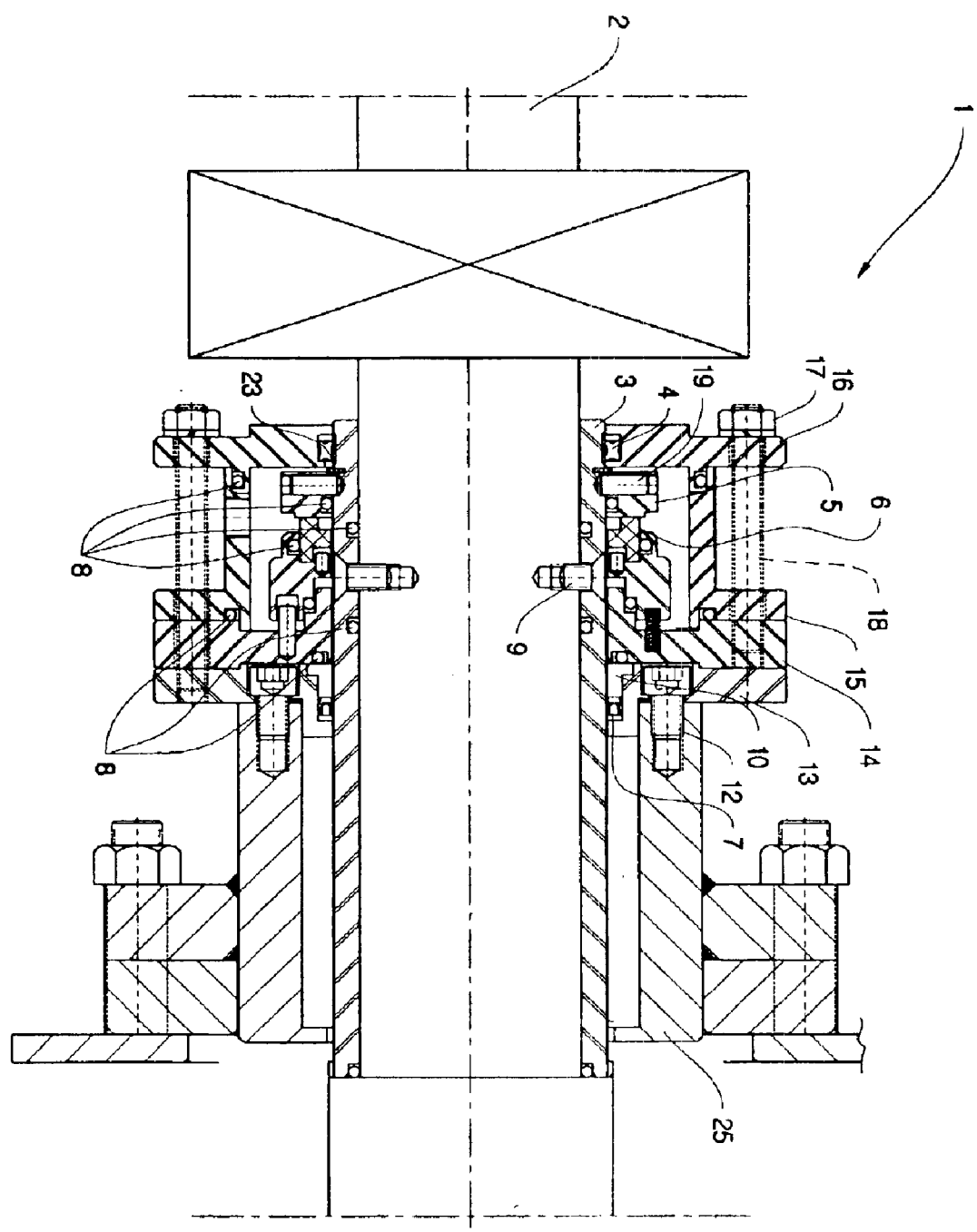
FIG. 4 is a sectional view of the mechanical sealing device for preventing fluid leakage according to the second embodiment of this invention.

FIGS. 1 to 4 illustrate the preferred embodiments of the present invention. FIG. 1 is a sectional view showing a mechanical sealing device for preventing fluid leakage in accordance with the primary embodiment of this invention. FIG. 2 is an enlarged view of an interior sealing unit included in the sealing device of this invention of FIG. 1. FIG. 3 is an enlarged view of an exterior sealing unit included in the sealing device of this invention of FIG. 1. FIG. 4 is a sectional view of the mechanical sealing device for preventing fluid leakage according to the second embodiment of this invention.

As shown in FIG. 1, the mechanical sealing device of this invention is installed at a position around each of existing interior and exterior sealing units 31 and 32 which are installed at corresponding shafts 2 and 2-1. The two shafts 2 and 2-1 are mounted to the sidewall of a fluid tank 1. A power drive unit 30 is positioned between the two shafts 2 and 2-1.

A hole 1-1 is formed through the sidewall of the fluid tank 1 such that the first shaft 2 is inserted into the hole 1-1. A support plate 1-2 is mounted to the sidewall of the tank 1 at a position around the hole 1-1. A plurality of bolt rods 1-3 are set in the support plate 1-2 at regular intervals. The first shaft 2, to which the power drive unit 30 is mounted, is inserted into the hole 1-1. The second shaft 2-1 of a pipe shape is coupled to an end of the first shaft 2 exposed to the outside of the power drive unit 30.

That is, the first and second shafts 2 and 2-1 are provided on both sides of the power drive unit 30, respectively. The interior sealing unit 31 is installed at the first shaft 2, while the exterior sealing unit 32 is installed at the second shaft 2-1.

A plurality of O-rings 19 are fitted over the shaft 2 of the interior sealing unit 31 and the shaft 2-1 of the exterior sealing unit 32, respectively, so as to seal the shafts 2 and 2-1. A sleeve 3 is fitted over each of the two shafts 2 and 2-1, and fixed thereto by tightening a bolt 4. Two stuffing boxes 6 are mounted to the outer surfaces of the two sleeves 3 in such a way as to be opposite to each other. In this case, each of the two stuffing boxes 6 is provided with a plurality of gland packings 5. A flange 6-1, mounted to the first stuffing box 6 of the interior sealing unit 31, is fitted over the bolt rods 1-3 of the support plate 1-2 fixed to the fluid tank 1. The flange 6-1 is also fixed to the bolt rods 1-3 by nuts 1-4. A support frame 35 is mounted to the second stuffing box 6 of the exterior sealing unit 32, with a bearing 36 interposed between the frame 35 and the second stuffing box 6.

The mechanical sealing device 10 of this invention is mounted to each of the interior and exterior sealing units 31 and 32, which are constructed as described above.

A sealing chamber 14 is formed at the outside of the gland ring 7, which is used for holding the gland packings 5 provided in the stuffing box 6 of each of the interior and exterior sealing units 31 and 32. The sealing chamber 14 is formed by means of a seal casing 13, a flange 11 and a seal cover 12. The flange 11 and the seal cover 12 are provided at both sides of the seal casing 13, respectively, and are integrated into a single structure by connecting them to each other by a stud bolt 25 and a nut 26.

Rotary and stationary sealing rings 17 and 16 are provided in the sealing chamber 14. The rotary sealing ring 17 is supported by a jig 24 which is mounted to the sleeve 3 and is screwed to the sleeve 3 by a setscrew 20. The stationary sealing ring 16 is in contact with both the rotary sealing ring 17 and the sleeve 3, and is held by a slip ring 15.

In such a case, the stationary sealing ring 16 is positioned inside the slip ring 15. A spring 18 is provided between the flange 11 and the stationary sealing ring 16 such that the stationary sealing ring 16 is elastically biased. A set-pin 21 is fitted into the flange 11. The stationary sealing ring 16 is provided on the surface thereof with a set-pin insertion hole so as to prevent unexpected rotation of the rotary sealing ring 16 biased by the spring 18.

A U-cup ring 28 is mounted to the inner surface of the gland ring 7 in such a way as to come into contact with the sleeve 3. An adapter 27 is positioned between the U-cup ring 28 and the flange 11 so as to hold the U-cup ring 28 in place. A quarter ring 23 is mounted to the inner surface of the seal cover 12 in such a way as to be in contact with the sleeve 3.

A plurality of O-rings 19 are interposed between the inner surface of the rotary sealing ring 17 and the sleeve 3, between the stationary sealing ring 16 and the slip ring 15, between the flange 11 and the slip ring 15, and between both sides of the seal casing 13, the flange 11 and the seal cover 12, respectively, so as to seal the junctions between them. A nitrogen gas injection hole 29 is formed on the seal casing 13 such that nitrogen gas is injected into the sealing chamber 14 through the nitrogen gas injection hole 29.

As shown in FIG. 3, the mechanical sealing device 10 of this invention may be installed at a position around the gland ring 7 in the same manner as that shown in FIG. 2, even when the gland packing 5 is not provided in the stuffing box 6.

Further, as shown in FIG. 4, the support frame 35 may be rotatably mounted to the outer surface of the stuffing box 6 with the bearing 36 interposed between the frame 35 and the stuffing box 6, and the nitrogen gas injection hole 29 is formed on the seal casing 13 for injecting nitrogen gas. Except for these elements, other elements of the sealing device are constructed in the same manner as that described for the embodiment of FIG. 2.

The operation of the mechanical sealing device according to this invention will be described in the following.

By the operation of the power drive unit 3, in the interior sealing unit 31, the shaft 2 is rotated along with the sleeve 3 which is screwed to the shaft 2 by the bolt 4 and the setscrew 20, and the rotary sealing ring 17. Meanwhile, in the exterior sealing unit 32, the stuffing box 6 is rotated along with the gland packings 5, the gland ring 7 and the flange 11.

As shown in FIGS. 2 and 4, when the sleeve 3 and the rotary sealing ring 17 are rotated along with the shaft 2 in the interior sealing unit 31, the gland packings 5 interposed between the sleeve 3 and the stuffing box 6 maintain the seal, so the gas produced from the fluid contained in the fluid tank 1 is prevented from leaking to the outside by the gland packings 5, thus preventing the gas from leaking to the outside. Although a part of gas passes through the gland packings 5, the gas is effectively prevented from leaking to the outside by the U-cup ring 28, the adapter 27, and the quarter ring 23 provided in the stationary sealing ring 16 and the seal cover 12. In addition, the gas leakage is also prevented by the O-rings 19 which are interposed between the inner surface of the rotary sealing ring 17 and the sleeve 3, between the stationary sealing ring 16 and the slip ring 15, between the flange 11 and the slip ring 15, and between both sides of the seal casing 13, the flange 11 and the seal cover 12, respectively.

In the interior sealing unit 31 of FIG. 4, although the gas produced from the fluid contained in the fluid tank 1 flows into the stuffing box 6 because there is no gland packing 5 in the stuffing box 6, the gas is prevented from leaking to the outside due to the U-cup ring 28 and the adapter 27 mounted to the gland ring 7. In addition, the gas is prevented from leaking to the outside by the mechanical sealing device 10 as described above.

As shown in FIG. 3, in the exterior sealing unit 32, when the stuffing box 6 is rotated along with the gland packings 5, the gland ring 7 and the flange 11, the gland packings 5 interposed between the sleeve 3 and the stuffing box 6 keep the sealed state, so gas produced from the fluid contained in the fluid tank 1 is contained by the gland packing 5 to prevent its leakage. Although a part of the gas passes through the gland packings 5, the gas is prevented from leaking to the outside by the U-cup ring 28 and the adapter 27 mounted to the gland ring 7 as well as the quarter ring 23 provided in the stationary sealing ring 16 and the seal cover 12. Further, the gas leakage is also prevented by the O-rings 19 which are provided between the inner surface of the rotary sealing ring 17 and the sleeve 3, between the stationary sealing ring 16 and the slip ring 15, between the flange 11 and the slip ring 15, and between both sides of the seal casing 13, the flange 11 and the seal cover 12, respectively.

Further, the nitrogen gas is fed to the sealing chamber 14 through the nitrogen gas injection hole 24 formed on the seal casing 13. The nitrogen gas filled in the sealing chamber 14 prevents fluid, including gas, from flowing into the sealing chamber 14, and besides, cools the stationary sealing ring 17 which may be increased in its temperature when the stationary sealing ring 17 is in surface contact with the sleeve 3, thus accomplishing a desired cooling effect.

As described above, the present invention provides a mechanical sealing device for preventing fluid leakage, which is additionally installed at a position around a conventional sealing device having gland packings in a stuffing box, thus accomplishing a desired sealing effect in the case where the gland packings do not fulfill their sealing functions, and which is provided with O-rings interposed between several elements and is provided with stationary and rotary sealing rings which are in surface contact with other elements, thus accomplishing a high sealing effect, and which is designed in such a way that nitrogen gas is injected into a sealing chamber, thus accomplishing a desired cooling effect as well as a desired lubricating effect, and which can be independently used with the conventional sealing device excluded.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mechanical sealing device for preventing fluid leakage, comprising:

a support plate (1-2) mounted at a position around a hole (1-1) formed through a sidewall of a fluid tank (1) for receiving a first shaft (2) in the hole (1-1), with a plurality of bolt rods (1-3) arranged on said support plate (1-2) at regular intervals; the first shaft (2) inserted into the hole (1-1), with a power drive unit (30) being mounted to the first shaft; a second shaft (2-1) having a pipe shape and coupled to the first shaft (2) exposed to the outside of the power drive unit (30);

an interior sealing unit (31) installed on the first shaft (2) and an exterior sealing unit (32) installed on the second shaft (2-1), with two sleeves (3) fitted over the first and second shafts (2, 2-1) provided on both sides of the power drive unit (30);

first and second stuffing boxes (6) mounted to outer surfaces of the two sleeves (3) in such a way as to be opposite to each other, with a plurality of gland packings (5) being provided in each of the stuffing boxes (6);

a flange (6-1) mounted to the first stuffing box (6) of the interior sealing unit (31), said flange (6-1) being fitted over the bolt rods (1-3) of the support plate (1-2) mounted to the fluid tank (1), and fixed by nuts (1-4) tightened to the bolt rods (1-3); and a support frame (35) mounted to the second stuffing box (6) of the exterior sealing unit (32) with a bearing (36) interposed between the frame and the second stuffing box, further comprising:

a sealing chamber (14) formed by a flange (11), a seal casing (13) and a seal cover (12) at a position outside a gland ring (7) used for holding the gland packings (5) installed in the stuffing box (6) of each of the two sealing units (31, 32);

rotary and stationary sealing rings (17, 16) provided in said sealing chamber (14), said rotary sealing ring (17) being fixed to the sleeve (3), said stationary sealing ring (16) coming into contact with both the sleeve (3) and the rotary sealing ring (17) and held by a slip ring (15) biased by a spring (18), with the spring (18) provided between the stationary sealing ring (16) and the flange (11); and additional sealing rings provided on inner surfaces of the gland ring (7) and the seal cover (12), and coming into contact with the sleeve (3).

2. The device according to claim 1, wherein a plurality of O-rings (19) are interposed between the sleeve (3) and an inner surface of the rotary sealing ring (17), and between the stationary sealing ring (16) and the slip ring (15), and between the flange (11) and the slip ring (15), and between both sides of the seal casing (13), the flange (11) and the seal cover (12), respectively.

3. The device according to claim 1, wherein the additional sealing rings, provided on the inner surfaces of the gland ring (7) and the seal cover (12), comprise a U cup-shaped ring (28) and a quarter ring (23).

4. The device according to claim 1, wherein a nitrogen-gas injection hole (29) is formed on the seal casing (13) such that nitrogen gas is injected into the sealing chamber (14) through the nitrogen gas injection hole (29).

* * * * *